United States Patent
Paxton et al.

(10) Patent No.: US 8,656,437 B2
(45) Date of Patent: *Feb. 18, 2014

(54) SYSTEM FOR CAPTURE AND SELECTIVE PLAYBACK OF BROADCAST PROGRAMS

(75) Inventors: Brian Paxton, Hertfordshire (GB); Dominic A. Robinson, Hertfordshire (GB)

(73) Assignee: Video Networks IP Holdings Limited, Hamilton (BM)

( * ) Notice: Subject to any disclaimer, the term of this patent is extended or adjusted under 35 U.S.C. 154(b) by 192 days.

This patent is subject to a terminal disclaimer.

(21) Appl. No.: 13/012,569

(22) Filed: Jan. 24, 2011

(65) Prior Publication Data

US 2011/0119698 A1 May 19, 2011

Related U.S. Application Data

(63) Continuation of application No. 10/640,409, filed on Aug. 13, 2003, now Pat. No. 7,900,231.

(30) Foreign Application Priority Data

Feb. 12, 2003 (GB) .................................. 0303176.2

(51) Int. Cl.
  *H04N 7/173* (2011.01)
  *H04N 7/16* (2011.01)
  *G06F 3/00* (2006.01)

(52) U.S. Cl.
  USPC .................. 725/93; 725/28; 725/50; 725/54; 725/145

(58) Field of Classification Search
  None
  See application file for complete search history.

(56) References Cited

U.S. PATENT DOCUMENTS

| | | |
|---|---|---|
| 5,469,206 A | 11/1995 | Strubbe et al. |
| 5,485,221 A | 1/1996 | Banker et al. |
| 5,583,561 A | 12/1996 | Baker et al. |
| 5,737,030 A | 4/1998 | Hong et al. |
| 5,751,282 A | 5/1998 | Girard et al. |
| 5,790,176 A | 8/1998 | Craig |
| 5,805,804 A | 9/1998 | Laursen et al. |

(Continued)

FOREIGN PATENT DOCUMENTS

| | | |
|---|---|---|
| EP | 0 562 186 B1 | 2/1999 |
| EP | 1 137 282 A2 | 9/2001 |

(Continued)

OTHER PUBLICATIONS

Gizmodo "AOL's Mystro TV"; Mar. 10, 2003, download from http://gizmodo.net/archives/001458.php on Apr. 24, 2003, 2 pgs.

(Continued)

*Primary Examiner* — Chris Parry
(74) *Attorney, Agent, or Firm* — Buckley, Maschoff & Talwalkar LLC

(57) ABSTRACT

An apparatus for storing broadcast programs for future transmission to subscribers comprising means for receiving a broadcast channel data stream which comprises a plurality of sequential programs and, a data storage means, wherein, video and audio data relating to each program are extracted from a received broadcast channel data stream and stored on the data storage means at a known position, service information relating to each program is extracted from the data stream and stored at a known position on the data storage means with data identifying the position on the storage means at which the corresponding video and audio data for the program are stored.

16 Claims, 6 Drawing Sheets

(56) References Cited

U.S. PATENT DOCUMENTS

| | | |
|---|---|---|
| 5,900,904 A | 5/1999 | Okada et al. |
| 5,945,987 A | 8/1999 | Dunn |
| 6,002,832 A | 12/1999 | Yoneda |
| 6,138,147 A | 10/2000 | Weaver et al. |
| 6,233,389 B1 | 5/2001 | Barton et al. |
| 6,233,390 B1 | 5/2001 | Yoneda |
| 6,493,876 B1 | 12/2002 | DeFreese et al. |
| 7,020,081 B1 | 3/2006 | Tani et al. |
| 7,159,235 B2 | 1/2007 | Son et al. |
| 2002/0047899 A1 | 4/2002 | Son et al. |
| 2002/0059596 A1 | 5/2002 | Sano et al. |
| 2002/0122656 A1 | 9/2002 | Gates et al. |
| 2002/0124258 A1 | 9/2002 | Fritsch |
| 2002/0124262 A1 | 9/2002 | Basso et al. |
| 2003/0226150 A1 | 12/2003 | Berberet et al. |
| 2004/0017831 A1 | 1/2004 | Shen et al. |
| 2004/0034865 A1* | 2/2004 | Barrett et al. .......... 725/39 |
| 2004/0205811 A1* | 10/2004 | Grandy et al. .......... 725/28 |
| 2005/0283810 A1 | 12/2005 | Ellis et al. |

FOREIGN PATENT DOCUMENTS

| | | |
|---|---|---|
| EP | 1 185 095 A1 | 3/2002 |
| JP | 2002185891 A | 6/2002 |
| JP | 2002185931 A | 6/2002 |
| WO | 01/52000 A2 | 7/2001 |
| WO | 01/56285 A1 | 8/2001 |
| WO | 01/65862 A2 | 9/2001 |
| WO | 01/89213 A1 | 11/2001 |

OTHER PUBLICATIONS

Dillmor, Dan "AOL's TiVo Clone: Copyright Holders Trumps Customers" Mar. 10, 2003, download from http://weblog.siliconvalley.com/column/dangillmor/archives/00848.shtml on Apr. 24, 2003, 1 pg.

Del Colliano, Jerry "AOL's Time Warner's New "Mystro TV" To Compete With TiVo", Mar. 11, 2003, download from http://www.audiorevolution.com/news/0303/11.aol.shtml on Apr. 24, 2003, 2 pgs.

Minto, David "DVRs vs Mystro TV—let battle commence!", Mar. 11, 2003, download from: http://www.europemedia.net/shownews.asp?ArticleID=15330 on Apr. 24, 2003, 2 pgs.

Cluetron the weblog of Lucas Gonze; "Pseudo TiVo from AOL Time Warner", Mar. 10, 2003, download from mhtml: file://F:V01%20Video%20Networks%20Ltd\V01.001%20System%20for%20Capture%20and%2... on Aug. 21, 2003, 2 pgs.

* cited by examiner

SYSTEM FOR CAPTURE AND SELECTIVE PLAYBACK OF BROADCAST PROGRAMS

CROSS-REFERENCE TO RELATED APPLICATION

This is a continuation of and claims benefit and priority to, co-pending U.S. patent application Ser. No. 10/640,409, filed Aug. 13, 2003, and further incorporates by reference for all purposes, and claims priority to GB Application Serial No. GB0303176.2, filed 12 Feb. 2003, and titled "A SYSTEM FOR CAPTURE AND SELECTIVE PLAYBACK OF BROADCAST PROGRAMMES", this application is also related to, and hereby incorporates by reference for all purposes, co-pending and commonly-assigned U.S. patent application Ser. No. 10/640,410, filed on Aug. 13, 2003, for "SYSTEM AND METHOD FOR IDENTIFICATION AND INSERTION OF ADVERTISING IN BROADCAST PROGRAMS".

FIELD

Embodiments relate to the broadcast of programs. More particularly, embodiments relate to systems, methods, computer program code, and means for the capture and selective playback of broadcast programs.

BACKGROUND

Advances in technology have changed the way people watch television. The introduction of video cassette recorders (VCRs) allowed people to record broadcast programs for viewing at a later time. More recently, the introduction of personal video recorders (PVRs) and digital video recorders (DVRs) have provided viewers with even greater flexibility in recording programs. While these client-side devices are convenient, they have a number of disadvantages. For example, many such devices have limited storage capacity, preventing viewers from storing a large amount of programs. The devices can be noisy and require additional hardware to connect to program information sources. Further, many content providers and broadcasters are concerned about their inability to control the use and copying of programs recorded on these client-side devices.

Some broadcasters have attempted to provide viewing flexibility, while retaining control over programs, by providing a 'time-shifted' or delayed broadcast of an entire channel. The broadcast may be time-shifted by a number of minutes or hours, for example the entire schedule for a broadcast channel may be broadcast one hour later than the original broadcast. The time-shifted broadcast provides viewers with the opportunity to view programs which they may have missed when the program was originally broadcast.

Real time broadcast and time shifted broadcast do not provide the viewer with any control over when they can view the broadcast programs. Therefore, unless the viewer has recorded the program on a suitable storage facility, he can only view the program at the time determined by the broadcaster.

Certain operators provide subscribers with a view on demand facility. Typically, a broadcaster will broadcast a small number of selected events, e.g., movies, at regular time intervals. Viewers may subscribe to receive a particular broadcast of the event. After subscription, the event will be broadcast using satellite or cable distribution methods directly to the viewer's set top box. Once again, the broadcast times of the events can not be controlled by the user.

It would be desirable to provide broadcast systems and methods which overcome deficiencies associated with prior systems. For example, it would be desirable to provide systems and methods which provide viewers with a wide selection of program archival and viewing options. It would further be desirable to provide systems and methods which enforce viewing rules and restrictions imposed by broadcast content providers, channel owners, and regulators. It would further be desirable to provide broadcast systems which may deliver programs to viewers over telephone wires.

SUMMARY

To alleviate problems inherent in the prior art, the present invention introduces systems, methods, apparatus, computer program code and means for capture and selective playback of broadcast programs.

Some embodiments store broadcast programs for future transmission to subscribers and include receiving a broadcast channel data stream comprising a plurality of sequential programs, extracting video and audio data for each program from the data stream, extracting service information relating to each program from the data stream, storing the video and audio data for each program at a known position on a data storage means, and storing the service information for each program at a known location on the storage means with data identifying the position on the means at which the corresponding video and audio data for the program is stored.

Some embodiments relate to receiving a broadcast program on demand and include requesting a schedule of previously broadcast programs which are available for retrieval, receiving the schedule, selecting a program from the schedule for retrieval, transmitting a request to receive the selected program, and receiving the selected program.

Some embodiments relate to broadcast methods and systems which include receiving an input data stream including a program; extracting, from the input data stream, service information associated with the program; transmitting said program to a plurality of subscribers; creating, at substantially the same time as the broadcasting, an archive copy of the program, the archive copy stored at a known position in a short-term archive on a storage device and associated with the service information; and transmitting the archive copy of the program to a first subscriber upon receipt of a request from the first subscriber.

Some embodiments relate to operating a broadcast system, where the broadcast system receives a broadcast data stream having a plurality of programs, including generating a schedule of the plurality of programs from service information extracted from the broadcast data stream; receiving an archive request from a first subscriber, the archive request including a selection of a desired program from the schedule; confirming that the first subscriber is authorized to archive the desired program; creating an archive copy of the desired program; and permitting access to the archive copy by the first subscriber.

Some embodiments relate to a broadcast apparatus which includes a head end, coupled to receive an input broadcast channel data stream comprising a plurality of programs, the head end generating an output data stream comprising the plurality of programs in an output format; a service information processor, in communication with the head end and receiving the input broadcast channel data stream, the service information processor retrieving service information associated with each of the plurality of programs; a timeslip server, in communication with the head end and the service information processor, the timeslip server storing a copy of said plurality of programs and associating a storage location of each of the copies with service information associated with each of the programs; and a transmission network, coupled to the head end and to the timeslip server, the transmission network operable to transmit the output data stream to a plurality of subscriber devices and to selectively transmit the copies of the plurality of programs to the subscriber devices.

Some embodiments relate to set top boxes and include viewing a program schedule, the program schedule created based on service information extracted from a broadcast data stream having a plurality of programs; selecting a desired program from the program schedule; and causing the desired program to be copied from a temporary archive to a longer-term archive accessible to the set top box.

With these and other advantages and features of the invention that will become hereinafter apparent, the invention may be more clearly understood by reference to the following detailed description of the invention, the appended claims, and the drawings attached herein.

DETAILED DESCRIPTION

Figure 1:
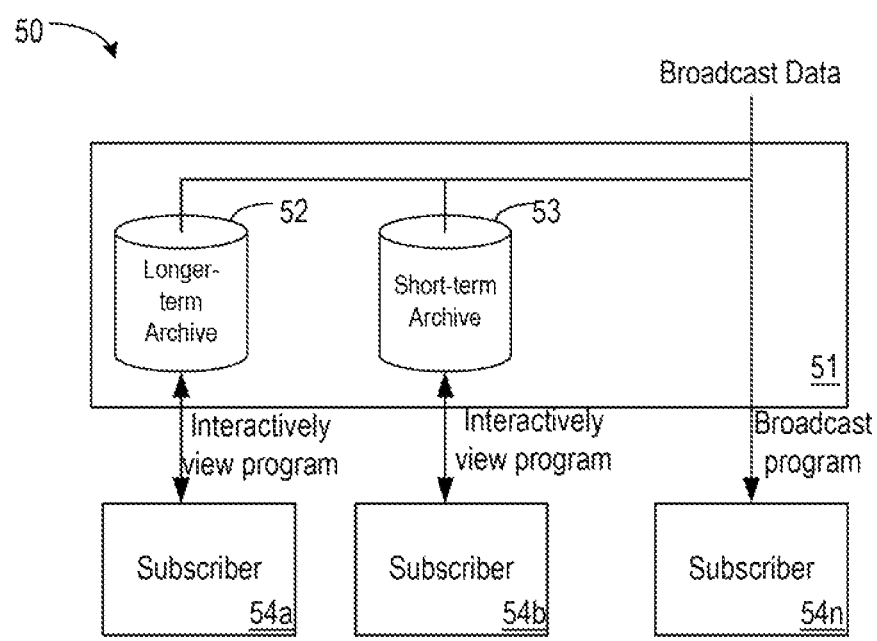
FIG. 1 is a block diagram of a broadcast system pursuant to some embodiments.

Embodiments relate to systems, methods, computer program code and means for the capture and selective playback of broadcast programs. For convenience, and ease of exposition, a number of terms are used herein. For example, the term "subscriber" is used to refer to an individual or entity which has a subscriber relationship with a broadcast service provider to receive and view broadcast data (either live broadcast data or archived broadcast data or both). A subscriber, for example, may be associated with a particular set top box identifying the subscriber. "Subscribers" may also be referred to herein as "users" or "viewers". As used herein, the term "set top box" is generally used to refer to devices associated with subscribers which receive broadcast data from a broadcast data service provider. A set top box may be a dedicated device designed to receive broadcast data, or it may be implemented as a component or function associated with a personal computer or other computing device.

The term "broadcast service provider" or "service provider" may be used to refer to an entity (or entities) which operate components of broadcast systems pursuant to embodiments described herein to deliver live broadcast data and archived broadcast data to subscribers. For example, in some embodiments, a "broadcast service provider" may be an entity which operates (or is associated with) one or more systems configured to transmit programs to subscribers. In some embodiments, broadcast service providers operate systems including exchanges or central offices that are configured to deliver digital data to subscribers over the twisted pair communication lines that are present in many households and businesses around the world (e.g., such as telephone or copper wires). In some embodiments, broadcast service providers deliver this data using digital subscriber line ("DSL") techniques. In one illustrative embodiment to be discussed herein, a broadcast service provider delivers digital data using asymmetric DSL ("ADSL") techniques, although those skilled in the art will recognize that other DSL techniques (generally referred to as "xDSL" may also be utilized). Further, although wired communication techniques are discussed, those skilled in the art will appreciate that features of embodiments may also be implemented using wireless techniques.

As used herein, the term "live broadcast data" or "live broadcast program" refers to broadcast data viewed at the time scheduled and broadcast by the broadcasting entity. As used herein, the term "archived broadcast data" or "archived programs" refers to broadcast data or programs which is stored for viewing at a time later than the "live broadcast". Embodiments provide two different types of data archives: short-term archives (e.g., where programs are stored for a relatively short period such as 24-72 hours), and longer-term archives (e.g., where programs may be stored for a longer time period). For example, longer-term archives may allow storage of programs indefinitely. As another example, in some embodiments, a broadcast service provider may store programs for up to a set period (e.g., such as one month or one year). As yet another example, a broadcast service provider may periodically query subscribers to determine whether the archived program should be deleted from the archive.

By way of introduction, features of some embodiments will now be described by first referring to FIG. 1, where a depiction of a broadcast system 50 pursuant to some embodiments is shown. Broadcast system 50 includes one or more broadcast service providers 51 delivering content to one or more subscribers 54a-n.

Pursuant to some embodiments, subscribers may receive broadcast program data in several ways. For example, subscribers (such as subscriber 54n) may receive "live" broadcast programs; that is, the subscriber way view a program at the time at which it is being broadcast. As an illustrative example, (which will be continued throughout this description) a "live" broadcast program may be the "Evening News", broadcast every weeknight starting at 6 pm local time. Broadcast system 50 allows subscribers, such as subscriber 54n, to view this program at its designated time (at 6 pm local time). As used herein, (and as further defined below) the term "live" is used to generally refer to the actual and planned time of broadcast of a broadcast program (and is not necessarily intended to refer to a program which is both filmed and viewed at the same time). Pursuant to some embodiments, to minimize traffic on the backhaul to the ADSL central office or exchange, these "live" broadcasts are transmitted to subscribers 54 via multicast to avoid duplications of traffic. In this manner, embodiments increase the system's ability to transmit video and audio program data to a large number of subscribers without impairing the capacity of the backhaul (and thereby allowing a larger number of subscribers to interact with the system to selectively view archived programs as described below).

In some embodiments, subscribers are added to multi-cast broadcasts of programs using techniques such as those described by Internet Group Management Protocol (IGMP), IETF RFC 3376 (October 2002) (available at www.ietf.org) the contents of which are incorporated herein by reference for all purposes.

Embodiments allow subscribers (such as subscriber 54b) to view a program at some time after the "live" broadcast time. Embodiments generate and store a short-term archive copy of all broadcast programs received by broadcast service provider 51. Further details of how this short-term archive copy is generated and stored will be provided below. In general, broadcast service provider 51 includes a storage device 53 (or group of devices) adapted to store copies of broadcast programs for a number of different broadcast channels. In some embodiments, sufficient storage space is provided to store 24-72 hours of broadcast programs for a number of different channels. In conjunction with the generation and storage of these short-term archive copies, a schedule of programs is created. Subscribers wishing to view a program within 24-72 hours of the time at which it originally aired (that is, after the "live" broadcast) may interact with the schedule of programs to select the program and cause the program to be streamed to the subscriber. In some embodiments, these programs are stored in a manner which allows the subscriber to fast forward, pause, and rewind while viewing the program. As an example, subscriber 54b may choose to view the "Evening News" at 6:15 pm rather than at the "live" broadcast time of 6 pm. Further, subscriber 54b may fast forward, rewind, or pause as desired during his viewing of the program.

Embodiments further allow subscribers (such as the subscriber 54a) to select particular programs for longer-term archival. For example, broadcast service provider 51 or a subscriber (such as subscriber 54a as shown in FIG. 1) may wish to create a longer-term copy of a particular broadcast of the "Evening News". Subscriber 54a may indicate this desire by communicating with broadcast service provider 51 (e.g., via a set top box or other device as will be discussed further below). A copy of the broadcast may then be stored on a storage device 52 used for longer-term storage of programs. In some embodiments, the copy of the program is associated with information uniquely identifying the subscriber 54a so that the subscriber 54a may be allowed access to the program as desired. Subscriber 54a may then view the program as desired. For example, subscriber 54a may view the particular episode of the "Evening News" weeks after it aired. Subscriber 54a may repeatedly view the same episode until the episode is deleted from the archive (e.g., at the subscriber's request or once an archive period has expired). In some embodiments, to reduce storage needs, multiple subscribers may have access to a copy of a program stored in a longer-term archive. For example, information identifying each customer who has requested the creation of a copy of a program may be given access permissions to share access to an archive.

Embodiments allow each of these types of broadcasts to be selectively delivered to subscribers, providing subscribers with greater choice, control and flexibility in viewing. Pursuant to some embodiments, subscribers may access these broadcasts via telephone wires such as the copper telephone wires currently installed in many households. Some embodiments deliver broadcast and archived programs to subscribers using asymmetric digital subscriber line (ADSL) techniques (although those skilled in the art will appreciate that other techniques now known or later developed may be used to deliver programs pursuant to embodiments disclosed herein). In some embodiments, programs are delivered using encoding schemes such as the widely-used "Moving Picture Experts Group version 2" (MPEG-2) scheme, although those skilled in the art will appreciate that other encoding schemes may also be utilized.

Pursuant to some embodiments, broadcast data is delivered from broadcast service provider 51 to subscribers 54 using constant bit rate (CBR) encoding techniques, thereby providing a maximum bitrate that is used for both video and audio data. Applicants have found that the use of CBR encoding provides reliable and consistent content delivery over ADSL networks, despite issues with distance from the ADSL exchange (or "central office") and despite the demands for high bitrates to provide quality video services. Where video bitrates for particular programs vary, embodiments utilize encoders configured to pad or "stuff" the video data extra (blank) data to create an actual constant bitrate. Further, in some embodiments, the backhaul to the ADSL central office or exchange is "overbooked" to assume a particular level of contention which ensures sufficient bandwidth is available to subscribers. For example, in some embodiments, the backhaul may be designed such that 33% of all subscribers serviced by the backhaul are assumed to be active at any time. This may be implemented, in some embodiments, by reducing the number of subscribers associated with each digital subscriber line access multiplexor (DSLAM) associated with a particular exchange or central office.

Figure 2:
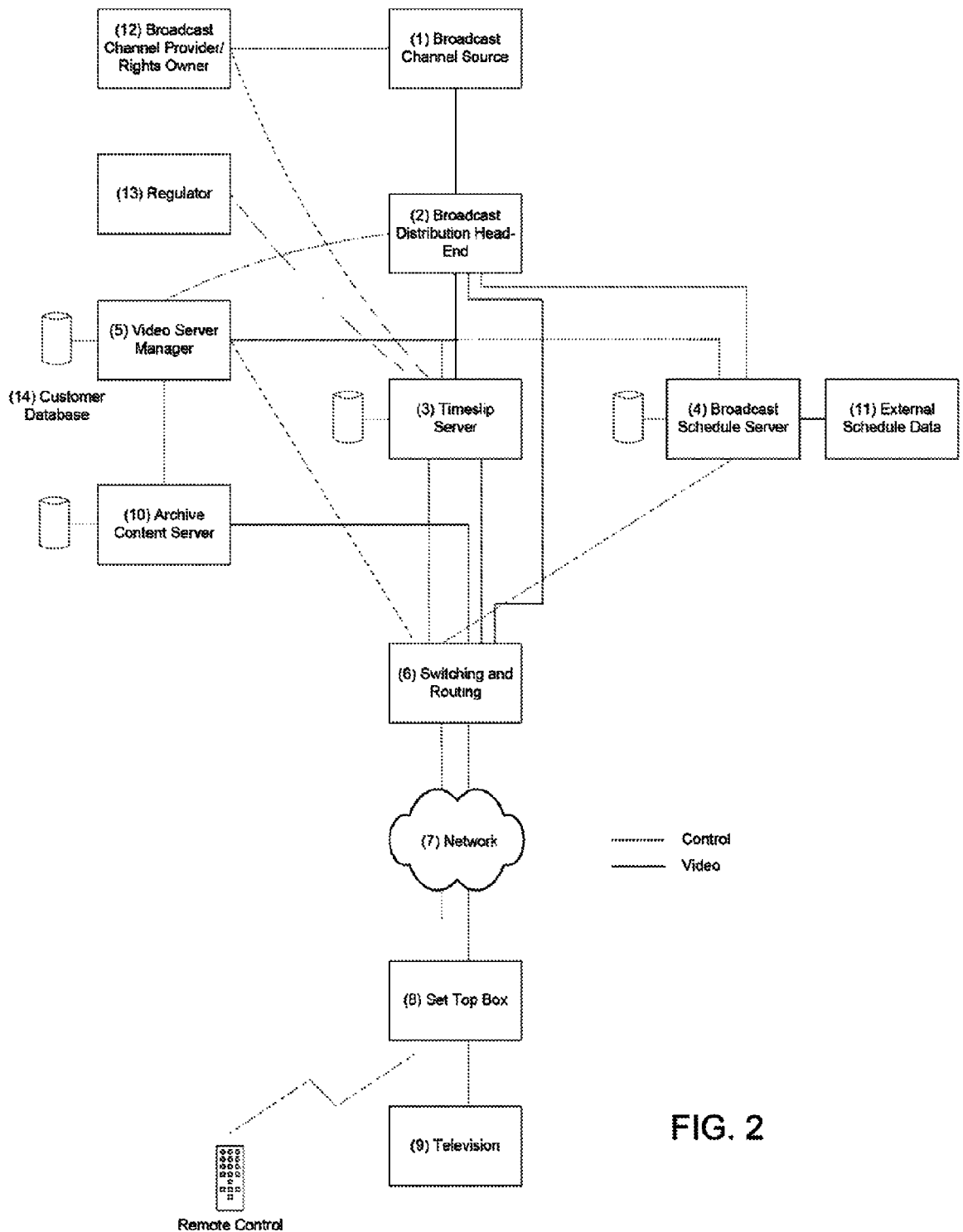
FIG. 2 is a block diagram of a broadcast system pursuant to some embodiments.

Further details of some embodiments will now be described by referring to FIG. 2, where a system pursuant to some embodiments is depicted. The system of FIG. 2 depicts a number of different components that may be operated by (or on behalf of) a broadcast service provider to allow a subscriber to view both live broadcast programs and archived programs on a television 9. A number of components of the system of FIG. 2 may be operated by, or on behalf of, a service provider offering broadcast and archived programs to subscribers. Some or all of the components may be implemented on one or more computing devices configured to perform the functions described herein. Although some components are shown as separate devices, some or all of the functionality described herein may be implemented on one or more computing devices or networks of computing devices.

In FIG. 2 a broadcast channel source 1 generates a data feed of broadcast channels which are provided to a broadcast distribution head-end 2 (BDHE). For example, broadcast channel source 1 may be any of a number of different types of sources of broadcast data, such as, for example, sources of television, video, audio, or other data. Each data feed includes video and audio information for each channel as well as service information (SI) for each program broadcast on each channel. The service information includes information about each program including start time and duration, and a synopsis of the program.

As used herein, the term "service information" (or "program specific information", or SI) refers to information embedded in the MPEG-2 transport stream as additional transport packets having unique packet identifiers. For example, SI may include electronic program guide information such as the nature of a program, the timing and channel on which it is located, and other information identifying the type, content, and timing of a particular program. In some embodiments, SI may include additional information such as a "service description table" (or SDT) providing information identifying the service provider of a program, an "event information table" (or EIT) containing program names, start times, durations, etc., and other timing and event information.

Broadcast data may be transmitted using a variety of communications media. For example, the broadcast channel source 1 may provide a number of channels of broadcast data as digital or analogue television captured by digital satellite, digital terrestrial, cable, digital subscriber line (xDSL), or as analogue or direct feeds over a network. In some currently preferred embodiments, the broadcast data is received from a digital source (or is otherwise converted into digital broadcast data prior to receipt by BDHE 2). Further, the digital broadcast data may be encoded using an encoding scheme such as the MPEG-2 encoding scheme, although other encoding schemes may also be utilized. Use of an encoding scheme such as MPEG-2 allows the receipt of digital broadcast data which includes encapsulated MPEG-2 transport stream service information associated with the digital broadcast data. This service information, as will be described further herein, provides for accurate timing of programs.

A number of broadcast channel sources 1 may be utilized in the system of FIG. 2. For example, in some embodiments, the system may receive dozens or even hundreds of different channel data feeds from various broadcast channel sources. Each channel data feed consists of a number of programs. These channel data feeds are acquired by BDHE 2. BDHE 2 includes video acquisition equipment and may also include encoders to compress the channel data into a form which is suitable for a set top box to decode and display on a television. The BDHE 2 may also include multiplexing equipment to multiplex the data. In some embodiments, the broadcast data is encoded into a digital video broadcast (DVB) standard, such as the MPEG-2 video and audio and encapsulated in an MPEG-2 transport stream. Further details of some embodiments of BDHE 2 will be discussed in conjunction with FIG. 3 below.

Following acquisition, encoding and multiplexing, each of the broadcast channels are directed, encapsulated in the MPEG-2 transport stream, to a timeslip server 3 and broadcast schedule server 4 under instruction from a video server manager 5. In some embodiments, the same output is sent to each server. In some embodiments, separate data is transmitted to a service information processor (not shown, but which may be configured as part of BDHE 2 or as a separate component) and then used to create schedule information at broadcast schedule server 4. The use of a service information processor will be described further below in conjunction with FIG. 3.

Timeslip server 3 is typically a computer system (or network of computer systems) with a storage capacity that allows it to save the data from the broadcast feeds locally. In some embodiments, all programs from each of the broadcast channels are stored at least for a period of time. For example, in some embodiments, timeslip server 3 may store 24-72 hours of programming from each of the broadcast channels, allowing subscribers to view programs from the broadcast channels for some period (e.g., 24-72 hours) after the time the program is originally broadcast. As will be described further below, timeslip server 3 also operates to allow subscribers to selectively archive broadcast programs for viewing at a time of their choosing. These longer-term archives may be stored at (or accessible by) archive content server 10.

Although further details will be provided below, in general, the timeslip server 3 receives a number of encoded channels of broadcast data from BDHE 2 and stores the video and audio data for each channel on a disk as a continuous stream. The timeslip server 3 also functions to accurately identify the start and end of each program as well as the locations where each program is stored on disk. This information allows the timeslip server 3 to quickly and accurately retrieve programs when requested by subscribers. Further, in some embodiments, the timeslip server 3 functions to store broadcast channel data so that it may be efficiently and accurately rewound or fast-forwarded upon request by subscribers. Further details of these features will be discussed further below.

The broadcast schedule server 4 interacts with the timeslip server 3 (and with other sources of schedule information) to construct an accurate historical schedule of programs. This schedule information is presented to subscribers who can interact with the schedule to select a desired program to view or to archive. Broadcast schedule server 4, as will be discussed further below, may create and maintain different types of schedules (e.g., including a long form, or detailed schedule, and a short form, or summary schedule). These schedules may be presented to subscribers and used by subscribers to interactively identify programs for viewing or archival (e.g., a subscriber may interact with a schedule to select one or more programs for viewing from the short-term archive, or to select one or more programs to be stored in the longer-term archive for later viewing).

The video server manager 5 controls the distribution of the digital broadcast data to viewers for live broadcasting of each channel. Video server manager 5 also stores (or has access to) customer information. For example, customer information may include information associating a particular customer or subscriber with the unique identifier assigned to the customer's set top box 8. Customer information may also include information used to track customer viewing preferences, demographic information, etc. Other information may also be provided as will be discussed below. The video server manager 5 provides control of switching and routing facilities 6 including unicast, multicast and broadcast of each channel. Each broadcast channel is transmitted across a network 7 to the set top box 8 which directs the data to the television 9. Network 7 may be any of a number of different types of networks or combinations of networks. For example, in some embodiments, network 7 is a wide area distribution network to local exchanges and local loop delivery using ADSL. Network 7 allows broadcast data to be delivered to subscriber set top boxes 8, and also allows the transmission of data from set top box 8 to switching and routing facilities 6 (e.g., to select programs for archive, for play of programs, etc.). Subscribers may also be able to access service or program information related to the current program via the set top box 8.

Set top box 8 may be any device configured to receive digital broadcast data at a subscriber's home. In some embodiments, where digital broadcast data is delivered to subscribers via ADSL techniques, set top box 8 includes a modem or receiver allowing the receipt and transmission of data over telephone wires. In embodiments where broadcast data is delivered in MPEG formats, set top box 8 includes an ability to decode the received MPEG data. In some embodiments, set top box 8 includes information uniquely identifying the subscriber associated with the set top box. For example, in some embodiments, set top box 8 may include a unique identifier such as a digital signature or other cryptographic identifier. This identifier may be provided on a tamper resistant device such as, for example, a smart card. This unique subscriber identifier may be appended to messages transmitted from the set top box 8 to the broadcast service provider, allowing the broadcast service provider to identify the subscriber. Further, the unique identifier may be used in setting up unicast sessions between the switching and routing 6 and individual set top boxes 8. Set top box 8 may be equipped with an infra red or other sensor, allowing a subscriber to interact with set top box 8 using a remote control device.

Embodiments provide subscribers with the ability to view live broadcast programs, view archived broadcast programs some period after the initial live broadcast (e.g., for a period of 24-72 hours after initial broadcast), or store and view specific programs in a longer-term archive for later viewing. For programs which are viewed after the initial live broadcast, subscribers are able to interactively control the play of the programs (e.g., subscribers may pause play, fast forward, or rewind as desired). Further, because embodiments create an accurate historical program schedule based on the actual broadcast data received by a broadcast service provider, subscribers can view and interact with a detailed and accurate schedule to select programs for viewing or for archival. Further, each of these viewing options is provided using relatively low bandwidth technologies such as ADSL, allowing subscribers to view and interact with a wide variety of broadcast programs over existing home telephone wires.

Further details of some embodiments will now be described by reference to FIG. 3, where an embodiment of a broadcast system 50 is shown. Broadcast system 50 includes one or more broadcast channel provider/rights owner(s) 12 which generates (or causes to be generated) broadcast data that is provided to BDHE 2 for distribution to subscribers via a number of set top boxes 8. In the depicted embodiment, digital broadcast channel data is received at BDHE 2 via one or more digital channel sources 30 (e.g., such as digital terrestrial, digital satellite, or digital cable sources). In some embodiments, this digital broadcast channel data is received encoded in MPEG (or similar) formats. As shown, digital broadcast channel data received in MPEG-2 format from digital channel source 30 is typically received in a "multiple program transport stream" (or MPTS) (that is, in a transport stream of packets having multiple programs encoded therein).

This MPTS of channel information is provided to a decoder 31 which decodes the digital broadcast channel data into serial digital information for each channel. Operation of decoder 31 causes the service information associated with individual programs to be lost. Pursuant to some embodiments, this service information (or at least portions thereof) is preserved by passing the digital broadcast channel data received at digital channel source 30 to a service information ("SI") processor 19. This SI processor 19 may be implemented as part of BDHE 2 or it may be implemented as a separate component in communication with BDHE 2.

SI processor 19 receives the digital broadcast channel data in MPTS format and then parses information from each broadcast channel to obtain detailed program information associated with each channel. For example, in some embodiments, SI processor 19 parses incoming data to obtain a "service description table" (SDT) and "event information tables" (EIT) for each broadcast channel. These tables provide information about each program as well as about upcoming programs on each channel. For example, the tables provide information identifying the name of the program, a description of the program, a duration of the program, start and end times (scheduled and actual) and information about the program's genre.

SI processor 19 returns information to BDHE 2 for multiplexing with the video and audio information for each channel. BDHE 2 re-encodes each channel into "single program transport streams" (or SPTS) using an encoder 32. This encoded audio and video information is associated with the SI information from SI processor 19 using a multiplexor 33. In some embodiments, SI processor 19 returns an MPEG transport stream containing program access table (PAT) and program map table (PMT) service information as well as private data carried on multiple program identifiers (PIDs) for each channel. Multiplexor 33 inserts these private PIDs alongside the audio and video data for each channel. To ensure playback consistency, in some embodiments, the total bandwidth used by each of the private data PIDs is at a constant bit rate (CBR). In general, the total bandwidth allocated to each private data PID which is re-associated with the audio and video data by multiplexor 33 is kept relatively small in comparison to the video and audio bandwidth.

Each of the MPTS transport streams are then divided into multiple individual single program transport streams (including SI data for each program) using a network interface 34. In some embodiments, network interface 34 is an MPEG-2 transport stream aware interface. The multiple single program transport streams are passed to the switching and routing devices 6 for routing (under direction of the video server manager 5) as live broadcast data to appropriate set top boxes 8.

In some embodiments, SI processor 19 may be configured to save further bandwidth by selectively parsing and using particular types of service information. For example, in some embodiments, subtitle information may be manipulated to reduce bandwidth. As a particular example, SI processor 19 extracts teletext subtitles from the MPTS data received from BDHE 2 by parsing the complete teletext stream and extracting only the subtitle information from the stream. For example, some broadcast systems include teletext subtitles in a particular "page" of teletext information associated with a broadcast. In some systems, the subtitles are include in teletext "page 888". In such an system, SI processor 19 is configured to repackage the "page 888" packets, and optionally inserts a new packet (e.g., such as a "page 100" packet) into the stream using another private data PID (again, in CBR).

The dropped teletext pages may, in some embodiments, be stored on a teletext server or database (not shown in FIG. 3) which can later be queried by a subscriber's set top box 8 during viewing of the broadcast program. As another example, DVB subtitles (where present) can also be extracted by SI processor 19 to reduce bandwidth. For example, SI processor 19 may parse the subtitle information and translate the subtitles into a bandwidth-reduced form (e.g., the information may be stored on a server and displayed only in response to particular queries from set top boxes 8). In this manner, SI processor 19 can operate in conjunction with BDHE 2 to remove certain types of service information from the transport stream, while ensuring that needed service information remains associated the correct programs.

SI processor 19 may also be configured to handle radio channels (e.g., by identifying radio channels as having audio-only PIDs). The audio-only PIDs may be passed directly to multiplexor 33 without need for re-encoding. Further, SI processor 19 may also be configured to extract interactive applications (which may be stored by video server manager 5 for use on-demand), thereby avoiding the need to use carouselling systems typically used in broadcast environments. In some broadcast environments, such as conventional satellite and cable systems, there is often no back channel which can be used to request interactive applications and associated assets. Previous systems overcome this lack of a back channel by using a carousel. For example, a channel provider repeatedly transmits (or "carousels") the interactive application and associated assets on a separate MPEG PID. These previous systems rely on the set top box to identify, retrieve, and cache this information. This can lead to problems. For example, if a viewer moves within an application, or moves from one application to another, the needed information may not have been cached, and the set top box must wait until the channel provider retransmits the data (or until the data reappears on the carousel). One protocol which is used to implement such carouselling techniques is specified by the Digital Storage Media Command and Control (DSM-CC) extensions of MPEG-2, Part 6. Embodiments disclosed herein allow broadcast systems to broadcast interactive applications without need for such carouselling techniques. Further, pursuant to some embodiments, alternative versions of interactive applications may be delivered to subscribers based on access rules or permissions established by channel providers or content owners (e.g., to ensure that only the latest version of a particular interactive application is made available to subscribers, etc.).

In addition to providing processed service information to the head-end for recombination with audio and video data for each program, SI processor 19 also provides the processed service information to broadcast schedule server 4 for use in creating accurate schedule data 15. By utilizing service information based on digital broadcast channel data as it is actually received by BDHE 2, embodiments are able to create a historical schedule with accurate information about the actual start and end times for broadcast programs on each of the broadcast channels received at BDHE 2. This information may be combined with published schedule data (e.g., such as broadcast schedule data published by broadcast channel providers/channel owners 12) to create schedule data 15 having substantially complete and accurate program information.

As an example, many programs, such as live sporting events, have a scheduled broadcast time which is an estimated time. This estimated time is used by the broadcast channel provider/rights owner 12 to produce a program schedule. Often, however, such programs may finish early (or late). Embodiments allow the creation of schedule data 15 which accurately identifies the actual schedule for the program. As will be discussed further below, this information may be utilized to accurately and efficiently archive programs for later playback (e.g., a sporting event that actually lasts for 47 minutes will be identified as lasting 47 minutes rather than some estimated time such as an hour).

The network interface 34 of BDHE 2 also provides the de-multiplexed SPTS data to timeslip server 3. As shown, timeslip server 3 has a number of different functional components. In particular, each of the de-multiplexed channels of SPTS data are provided to an acquire and store channel 42 which operates to read the received transport stream and store it onto the correct storage location in the next available storage device. Acquire and store channel 42 also operates to wrap around the end of each storage device and to maintain a circular buffer. In some embodiments, the transport stream received from BDHE 2 is stored in an unaltered format (i.e., it is stored in the format in which it is received). As depicted, the data is stored in separate storage devices 43, 44 (or storage areas) for each channel. In some embodiments, each storage device (or storage area) is configured to act as a circular or wrap-around buffer sized to store a certain amount of broadcast data (e.g., if the short-term archive function is intended to provide 24 hours of short-term archived programs, each buffer is sized to accommodate 24 hours of data). When the end of the buffer is reached, the oldest programs in the buffer are overwritten with the most recent broadcast programs for each channel.

Acquire and store channel 42 also operates to parse the private data SI packets from the transport stream. The private data SI packets are passed to a schedule table 41, along with storage information identifying where the program associated with particular SI data is stored. For example, schedule table 41 may include an information record for each program which includes the SI information for the program, along with disk location information particularly identifying the disk storage location on which the program is stored (e.g., such as a buffer location in a particular channel data store such as data stores 43 or 44). In some embodiments, the SPTS stream received by acquire and store channel 42 is CBR, allowing acquire and store channel 42 to reliably predict the amount of storage required for each program and to ensure the timeliness of reading data back off disk upon playout. CBR ensures that the output rate of a stream on playout equals the input rate.

Schedule table 41 may be configured to contain information identifying a list of channels, each of which is associated with records containing an event or program identifier, an event time, and a disk position at which the program is stored. This allows the start and end times of programs to be accurately located for playout. In some embodiments, the start and end positions are located at program boundaries. For example, the start and end positions may always be located on a video "group of programs" (GOP) or audio "packetized elementary stream" (PES) boundary to ensure that playback always begins at a safe point. In some embodiments, program information in schedule table 41 is removed once the circular buffer of programs wraps past the program.

Timeslip server 3 also includes a video and audio stream analyzer 45. Video and audio stream analyzer 45 operates to uniquely identify each video GOP boundary. The streams received by acquire and store channel 42 are parsed to identify these boundaries. The disk position of each GOP on each channel is stored in a GOP list 46. A GOP can span many MPEG transport stream packets (and may typically include approximately 12 video frames, including Intra or I frames, Predicted or P frames, and Bi-directional or B frames). Pursuant to the MPEG-2 standard, a GOP always starts with an I frame. In some embodiments, video and audio stream analyzer 45 is configured to identify these boundaries and to associate them with storage locations. Analyzer 45 further analyzes the streams to identify audio PES packet locations. Those skilled in the art will recognize that embodiments may be used with other standards as well (e.g., by parsing streams to identify boundaries established by those other standards).

Timeslip server 3 also includes a fast forward ("FF")/rewind ("REW") frame extractor 47 which is configured to extract I frames from video streams as they are being stored by timeslip server 3. In this manner, expensive and time consuming searches for I frames in response to subscriber requests are avoided. Both an FF and a REW stream are created by extracting the I frames and wrapping them in an MPEG transport stream. Transport stream timing information including PTS/DTS and PCR clock information are generated by timeslip server 3.

Embodiments utilize the placement of I frames at the start of each GOP to identify boundaries. GOPs do not necessarily contain the same number of frames; for example, encoders may sometimes terminate a GOP to insert an I frame on scene changes. Embodiments ensure an appropriate FF/REW playback speed by monitoring (and adjusting, if appropriate) the rate at which I frames are stored to disk. Unlike regular program playback, the output rate of FF/REW playback is not determined by the input rate (that is, the FF/REW information need not be stored at the same rate that it will be played back). Instead, the playback rate is configurable by specifying a desired interval between I frames. When writing FF/REW information to database 48, FF/REW frame extractor 47 may drop certain I frames in the feed received from the acquire and store channel 42. In this manner, the playback rate can be configured for consistency.

The time and storage location relationship between the FF/REW streams and the original content stream is stored (e.g., at data store 48) to allow timeslip server 3 to locate the correct FF/REW point when requested and to ensure that after completion of a FF/REW that the correct point of the program is located to resume play. Playback pacing is controlled by timeslip server 3 by using switching and routing 6 (or other output device) as an accurate timing source (e.g., in an ATM environment, the ATM switch may be used as a timing source).

Timeslip server 3 also includes a playout module 49 to control playout of archived programs. Playout involves locating the start of a requested program and streaming the content off the appropriate storage device to the particular set top box 8 associated with the subscriber who requested the content. A request message submitted from a set top box 8 will include information identifying the particular subscriber making the request (as well as information to allow switching and routing devices 6 to set up a unicast session with the set top box). When a subscriber requests a program, the request is routed to timeslip server 3 through playout module 49 which causes schedule table 41 to be consulted to identify the start point of the requested program. In some embodiments, the start point of each program is aligned to a GOP or audio PES packet to ensure a clean start to the playback. Playout continues until the end of the program is reached or until other instructions are received, such as, for example, a request to stop playout, a request to skip, or a request to view another program.

If a program is skipped or another program is selected, the current program continues to play until the end of the video GOP (or audio PES packet) is reached. Once reached, a message is transmitted to set top box 8 using a private data PID packet warning the set top box 8 of an impending discontinuity. Playback continues from the start of the next program or nearest GOP (or audio PES) frame to the skip point. Timeslip server 3 may be configured to play back from either the nearest video GOP frame (or audio PES packet), allowing different types of set top boxes to be used with the system (as different set top boxes may respond differently to discontinuities in playout).

As discussed above, embodiments permit subscribers to selectively request the creation of an archive copy of a program for storage in a longer-term archive. Timeslip server 3, under direction from video server manager 5, may operate to cause one or more programs to be saved by an archive content server 10. For example, as will be discussed further below, a subscriber may request that a particular program be archived for future viewing by the subscriber. This request is transmitted from the subscriber's set top box 8 to video server manager 5 which causes a request to be sent to the timeslip server 3. When the SPTS packets including the requested program are received by timeslip server 3, timeslip server 3 functions to initiate the transmission of a copy of the program to archive content server 10 for storage in an archive data store 17.

In some embodiments, these archive features may result in the storage of at least two copies of a program: one copy in archive data store 17 (the "longer-term" archive, for later retrieval by the subscriber(s) requesting the archival) and one copy in timeslip server 3 (the "short term" archive, for viewing by any subscriber desiring to view a program during the period in which the system stores broadcast programs). As a result, embodiments provide for greater longevity and choice of viewing of programs. The version stored by timeslip server 3 may be viewed as a more ephemeral content store providing a viewing window of, for example, several days after the program is broadcast, while the version stored by archive content server 10 may provide for longer term storage and viewing of the program. That is, in some embodiments, timeslip server 3 provides a circular buffer of archived programs for each channel, while archive content server 10 provides dedicated long term storage of selected programs.

In some embodiments, a number of different storage configurations may be used for storing program information. For example, hard disks or tape drives may be used. Entire disks may be used, or partitioned disks. As a further protection against failure, RAID partitions may be employed. In some embodiments, multiple disks per channel may be used. In some embodiments, multiple redundant disks may be used to store identical content, reducing failure and potentially allowing for automated failover recovery. Further, such a configuration may provide improved overall performance by spreading the load on very popular channels over multiple disks. In this manner, live broadcast data may be delivered to authorized subscribers while generating service information data, archiving programs, and constructing an accurate historical schedule.

In some embodiments, not all channels are provided to all timeslip servers. For example, in some embodiments, the allocation of channels to timeslip servers is dependent on the popularity of programs available on that channel. The allocation of channels to timeslip servers is done in such a way to result in the set of timeslip servers being capable of satisfying peak time simultaneous viewing.

In some embodiments, playback of a program (e.g., either from a longer-term or short term archive) may also include the selection and insertion of advertisements into the program for transmission to a subscriber. In some embodiments, this selection and insertion is performed under control of video server manager 5 which has access to information identifying the location of advertisements in each program and channel. Video server manager 5 may also have access to a database of advertisements (e.g., such as ad database 20). Further details of the identification, selection and insertion of advertisements are provided in our co-pending, commonly-assigned U.S. patent application Ser. No. 10/640,410, filed on Aug. 13, 2003.

Figure 4:
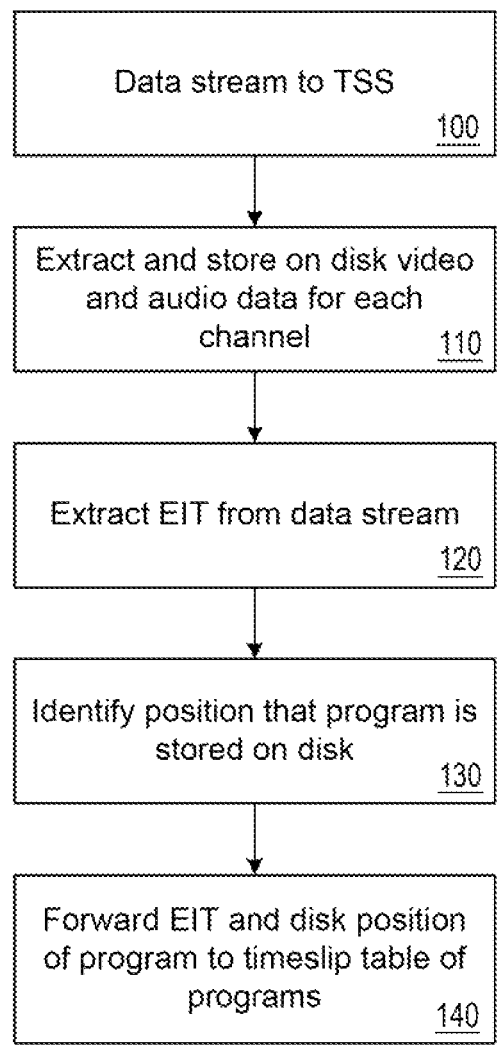
FIG. 4 is a flow diagram showing a procedure for storing programs and event information on a timeslip server in some embodiments.

Reference will now be made to FIG. 4, where a flow diagram is shown representing a method pursuant to some embodiments of the present invention. The flow diagram of FIG. 4 (and other flow diagrams contained herein) include a number of process steps. These process steps need not be performed in the sequence shown; those skilled in the art will appreciate that different sequences consistent with embodiments discussed herein may be used. The flow diagram of FIG. 4 generally depicts a flow which may be performed by timeslip server 3 to create a short-term archive of programs. As discussed above, the broadcast data streams for all broadcast channels are sent from BDHE 2 to the timeslip server (TSS) 3. This is represented by item 100 of FIG. 4.

Generally, as discussed above, timeslip server 3 acquires each of the encoded and de-multiplexed channels of broadcast data and stores the video and audio data for each channel on disk as a continuous stream (at 110). In some embodiments, the amount of broadcast data stored is limited by the disk capacity. In some embodiments, each channel of the broadcast data is stored on a continuous stream disk (or set of disks). When the disk capacity is reached, timeslip server 3 overwrites the earliest broadcast data for the channel in a circular fashion. When the storage capacity is full, the earliest program in a channel is removed from timeslip server 3 to make space for the new program in the channel.

As discussed above, in embodiments which are implemented using MPEG encoding, the MPEG transport stream for each channel carries "service information" (or SI) relating to the programs being broadcast. The service information includes a wide variety of information relating to the programs. In known systems the service information is usually used by devices to 'tune' to a particular channel. For example, satellite transmission uses the MPEG TS "Program Association Table" (PAT) and "Program Map Tables" (PMT) to identify parts of the broadcast stream ("Program Identifiers" (PIDs)) which contain video, audio and other data sources. The set top box 8 which receives this broadcast stream includes a decoder which then 'tunes' to these PIDs by setting its decoder to point to those stream locations. PATs and PMTs are part of the SI.

As discussed above, the service information carries an individual "event information table" (EIT) which contains an event for each program. The EIT may contain data including event identification (IDs) (or program IDs), start time, duration, program name, synopsis and genre. Further information may be included in the EIT. The event ID allows a broadcast channel provider or rights owner to specify conditions under which a specific program can or cannot be broadcast (e.g., the "program rights rules"). The program rights rules may include, but are not limited to, rules regarding whether a program has been paid for, age restrictions and time of day restrictions. Additionally, regulatory rules can be applied. For example, in the United Kingdom (and other countries), "watershed" rules may proscribe certain types of broadcasts at certain times of the day (for example, adult programs are not to be broadcast at certain times of the day). Embodiments may enforce these broadcast restrictions using program rights rules to control access to the programs that were originally broadcast during these restricted periods. In certain cases, program owners may specify that users are not permitted access to a particular program. In some embodiments, the event ID may also identify the name of the program or another form of individual identification, for example an alpha-numeric code.

The "event information table" (EIT) for a particular program is contained in the data stream and is synchronized with the start of the program. In some embodiments, the EIT is retrieved from the service information by SI processor 19, and then reintroduced into the data stream by the multiplexor 33. Timeslip server 3 extracts the event data from the stream at 120 and compiles a table of programs (shown as the schedule table 41 of FIG. 2). Timeslip server 3 identifies the position on the disk that the program is stored at 130 and this position information is added to schedule table 41 with the corresponding event data at 140. In this manner, the event data for each program is mapped to a position on the disk at which the program is stored to enable the program to be easily retrieved. This mapping of the event data to the position of the corresponding program on the disk enables programs to start at random points in the continuous channel data stream and to be easily retrievable.

Timeslip server 3 can capture many channels simultaneously and many simultaneous playback sessions are possible. Therefore, many users can retrieve the same program simultaneously. Timeslip server 3 constructs a table at 140 which identifies all programs which are currently stored on the disk, the event information for each program and the position on the disk at which each program starts. The timeslip server also includes a timebase which may be obtained, for example, from a time and date table/time offset table. This time and date information is provided to the timeslip server 3 in the private data PIDs.

When the disk used to store program information for a particular channel reaches full capacity, the earliest stored program is overwritten. When a program begins to be overwritten the event information and start point of that program is deleted from schedule table 41 such that no further record exists of that program. Schedule table 41 knows the storage capacity of each of the channel storage devices 43, 44 of timeslip server 3 and hence the available hours of storage and is constantly updated as new programs are stored and old programs overwritten.

In some embodiments, the BDHE 2 (or SI processor 19) also sends a data feed to the broadcast schedule server (BSS) 4. As discussed above, BSS 4 may be implemented as a computer system with a local storage facility which operates, in part, to extract the service information from the data stream including the EIT. BSS 4 does not extract the video and audio data for each program. In certain embodiments, the same computer system is used for timeslip server 3 and BSS 4.

The information extracted by BSS 4 includes event ID, program ID, start time, program duration, program description and program genre. Further information may also be available in the SI. The information is stored in a local database and BSS 4 uses the information to build a historic schedule of programs for each channel. The information is compiled into a user friendly format to enable subscribers to browse and interact with the schedule. The schedule is built in real time as programs are broadcast and received. In some embodiments, BSS 4 also operates to identify any program rights rules which are associated with a particular program. BSS 4 can also acquire information about forthcoming programs to be broadcast. These are added to the schedule. The schedule is linked to the time base and so the BSS 4 knows when a program is presently being broadcast. The BSS 4 maintains schedules for all broadcast channels supplied by the headend.

Figure 3:
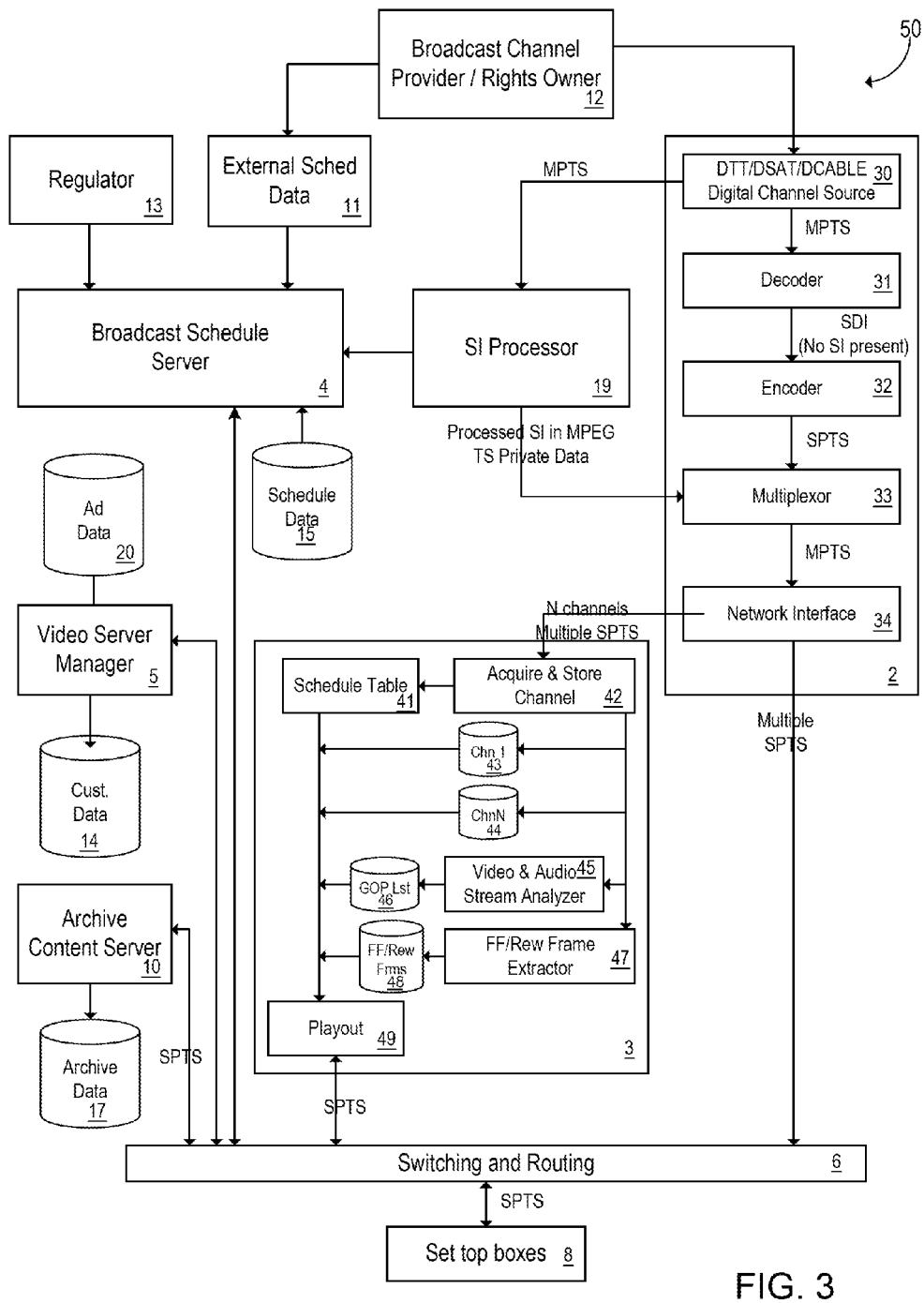
FIG. 3 is a block diagram of a broadcast system pursuant to some embodiments.

If detailed event information is not included in the service information for a particular program, further information may be added to the schedule from external data sources (e.g., such as external schedule data 11 provided by broadcast channel provider/rights owner(s) 12 shown in FIGS. 2 and 3). For example a synopsis of a movie may be added via a computer link.

The schedule data 15 consolidated by BSS 4 and the schedule table 41 created by TSS 3 are generally synchronized since both the TSS and BSS receive the same synchronized input broadcast stream from BDHE 2 and therefore receive identical and synchronized event tables. Further, BSS 4 may be configured to know the storage capacity of each of the channel data stores of TSS 3 and therefore, will update the schedule automatically as programs are deleted from TSS 3. In some embodiments, TSS 3 may transmit information to BSS 4 indicating when programs are deleted from TSS 3 to enable to BSS 4 to provide an accurate schedule of available programs.

Figure 5:
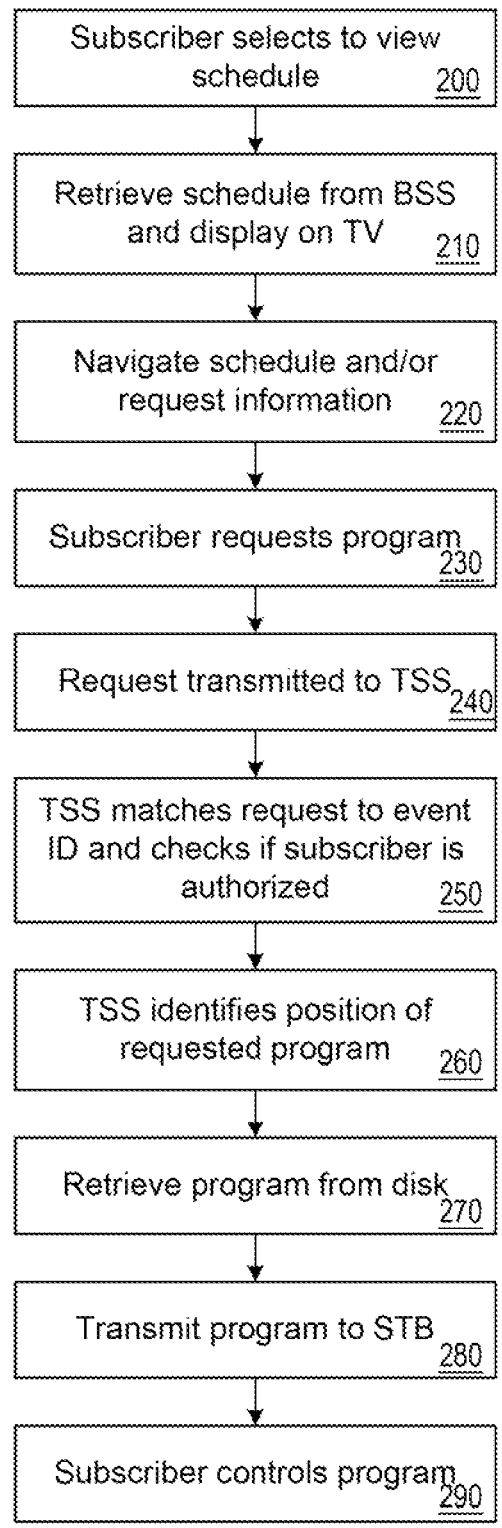
FIG. 5 is a flow diagram showing a selection and retrieval procedure for a program from the timeslip server in some embodiments.

The BSS schedule data 15 is transmitted from BSS 4 and is switched and directed using switching and routing 6 to the network and is then directed to set top boxes 8 for subscribers to view. Reference is now made to FIG. 5 where a flow diagram is presented which depicts a process by which a subscriber interacts with a schedule created by BSS 4 to select a program for viewing. At 200, a viewer (or subscriber) can select to view the schedule created by the BSS 4. The schedule created by BSS 4 is retrieved and transmitted to the subscriber's television (or other display device) via the set top box 8 at 210. At 220, the subscriber can navigate around the schedule and request further information. At 230 the subscriber requests a specific program for viewing. Once a program is selected the request is sent via network 7 to timeslip server 3 at 240. Timeslip server 3 consults schedule table 41 and matches the program by the event ID at 250. Timeslip server 3 (or BSS 4 or video server manager 5) may additionally check or verify that the subscriber is, in fact, authorized to view the requested program. If the program is in the schedule table 41, and if the subscriber is authorized to view the requested program, processing continues at 260 where timeslip server 3 identifies the stored disk position corresponding to the requested program. The position is then used by timeslip server 3 to retrieve the requested program from the data store at 270.

The program is then transmitted to the subscriber's set top box 8 across network 7 via a point to point transmission link. The requested program will play from the start of the program, or from the point that the subscriber has chosen at 280. The subscriber has full control over his viewing of the program and will be able to pause, rewind and fast forward the retrieved program at 290. Embodiments permit timeslip server 3 to unicast or otherwise supply archived programs to many subscribers simultaneously. For example, timeslip server 3 tracks the location on each disk where each subscriber is located, and reads data from the appropriate points on the disk in a timely manner to send to each subscriber's set top box 8.

At the end of the program the program may stop or may continue playing into the next scheduled program on that channel. In some embodiments, the subscriber may be returned to a live broadcast on either the channel on which his retrieved program was broadcast or on the channel which he was viewing before the archived program was retrieved.

Embodiments utilize the schedules created by BSS 4 and timeslip server 3 to allow subscribers to interact with the system in a number of different ways. For example, a subscriber may view the schedule to identify a current live broadcast program to view. Subscribers may also view the schedule to identify programs to view from the short term archive (e.g., programs which aired in the last several days). Further, subscribers may interact with the schedule to identify programs to archive (e.g., to identify programs to add to the longer-term archive for viewing by the subscriber), or to retrieve programs from the longer-term archive.

The program schedule is delivered to subscribers via the set top box 8, and a subscriber interacts with the program schedule using a remote control unit, computer input device, or other navigational devices. On selecting the program schedule the set top box 8 retrieves the program schedule from the BSS 4. The program schedule is then displayed on the subscriber's television or display device. For example, the schedule may include a listing of each program from each channel, displayed from the current time backwards. Additionally, future schedules may be retrieved from the BSS 4 and displayed.

In some embodiments, a subscriber's interaction with the schedule may also include application of access rules or program rights rules. For example, in some embodiments, when a subscriber desires to view a listing of future programs from the schedule, program rights rules may first be applied before the schedule is presented to the subscriber, resulting in presentation of a schedule which only shows those programs which the subscriber has the authority to view. In some embodiments, these program rights rules may be enforced after a subscriber requests to view a program or after a subscriber requests that a program be stored in a longer-term archive.

A subscriber may browse this list and find further information about future programs. Subscribers may also set reminders, in which case the set top box 8 will inform the subscriber at an appropriate time before the program is due to be broadcast, that it is about to start. By default the BSS 4 returns to the list of programs, starting from the next program to be broadcast.

The subscriber can navigate the schedule by means of a cursor which can be controlled by a remote control device or other suitable means. In some embodiments, a selected program is highlighted and the subscriber can request further information about the program. The schedule may also include icons or color coding to indicate the availability or content of particular programs.

Different types of schedules may be available to the subscriber. For example a long-form timeslip schedule (LFTS) may be provided which indicates all programs which are available for viewing. Further, a short-form timeslip schedule (SFTS) may be provided which lists only the current, previous and next programs. Both schedules are provided to subscribers by the BSS 4.

In some embodiments, the LFTS is an on-screen schedule of content that presents a list of programs broadcast within a pre-defined window (e.g. the previous 72 hours, or the time period in which the short-term archive stores programs) as well as a list of the current program and future programs. Subscribers can access the list of programs stored in the short-term archive that are available to view on demand (subject to permissions and access rules). In some embodiments, the LFTS indicates the availability of individual programs through the use of icons (or, the lack of icons), and short synopses of each highlighted program.

In some embodiments, the SFTS is displayed when a subscriber selects a live broadcast channel to view, or changes between live broadcast channels. The SFTS may display the program currently playing on the selected broadcast channel, the next program(s) as well as the program(s) just broadcast. The subscriber can select to view the previous program(s) (from the short-term archive) directly from this menu, or the subscriber may interact with the set top box 8 to call up the LFTS to access the full range of program and navigation options. The subscriber can bring up the SFTS for a broadcast channel different than the one showing on screen, and select programs to view from the other channel (both programs currently being broadcast, and also previously broadcast programs).

There may be many pages or screens of program schedule information. To view each of these pages, the subscriber may interact with the set top box 8 to scroll individual items or move page by page. The subscriber may select schedules for different channels. In some embodiments, switching between channel schedules may be performed while maintaining the same time reference between the channels.

In some embodiments, subscribers may interact with program schedules in other ways. For example, the communication link between the BSS 4 and each set top box 8 is interactive and allows subscribers to send a variety of search commands or messages to the BSS 4, allowing subscribers to search the schedule for programs using search criteria including type of program or genre. Such a genre or type search may cause BSS 4 to retrieve a listing of matching programs to the subscriber's set top box 8 for display. The subscriber may then select one of these programs from the list. Furthermore, in a schedule listing, a subscriber can be given the option to find similar programs matching the genre of the currently selected program, in which case the BSS 4 will return a list of matching programs which will be displayed to the subscriber for selection.

Selection from a genre based menu allows subscribers to select from a list of programs by genre (e.g. "drama" or "soap opera"). For example, a display of all matching programs, across different broadcast channels, may be presented to the subscriber for selection. In some embodiments, access rules or privileges may be applied to restrict certain programs from being selected by the subscriber. In some embodiments, information may be captured to identify which genres are most frequently watched. This information may be used to display a list of genres in order of the frequency and time of viewing by individual households, or in orders determined by other criteria.

In some embodiments, subscribers may select from the program schedule by identifying similar content. For example, a subscriber may select or highlight an item of content on the LFTS and bring up a list of similar programs by genre category. This can either be selected from within the current broadcast channel environment or from some or all of the broadcast channel schedules on the service. This enables a viewer of Soap Opera A to easily find other programs within the same genre, e.g. Soap Opera B. This can be displayed either by channel order, by time or according to other criteria.

In some embodiments, a subscriber is able to designate specific programs as favourites. Such customer-related information may be stored at customer database 14. When the subscriber chooses to access his favourites, they are presented with a list of their favourite program names.

Selecting one of these favourite program names causes the subscriber's set top box 8 to submit a request to the BSS 4 to search its stored program schedule for all programs of the same name as the favourite. A list of matching programs is returned, and additionally, the date and time of original broadcast may be displayed. The viewer can choose a program from this list for playback.

In some embodiments, subscribers may enter or save program titles to their favourites area. This enables them to quickly access all of the programs, with that name, that have been broadcast within the appropriate time window. Different episodes of the same program are presented with the most recent first and with the time that they were originally broadcast (or presented according to other criteria). Repeat programs can either be included or excluded from this list, e.g., the same episode but broadcast at different times.

Other methods of selecting a specific program can be envisaged. For example, in some embodiments, a subscriber may identify a program by entering a code associated with that program. Examples of this include, but are not limited to, entering the program's Program ID, entering a VideoPlus code, or swiping a bar code.

In some embodiments, all program selections made by a subscriber are subject to a determination that the selection complies with any access rules, permissions, or program rights rules. In some embodiments, these rules are enforced by the timeslip server 3. In some embodiments, further controls are provided by restricting access to certain programs via a personal identification number (PIN) or similar mechanism. A further embodiment prevents unavailable programs being presented as options to the viewer.

In some embodiments, the application of program rights rules, access rules or permissions ensure that a program is only permitted to be viewed if it is available to the particular subscriber seeking access. Information affecting the availability of a program to a particular subscriber include information provided by channel owners, program owners, regulators and broadcast service providers.

For example, channel owners may not own the rights to allow the broadcast service provider to store and playback (e.g., from either the short-term or the longer-term archives) a particular program. Examples of this type of situation include motion pictures or sporting events for which the channel owner does not hold on-demand rights (e.g., broadcaster A broadcasts program B which is owned by company C, but cannot provide the rights to that program themselves. If owner C does not provide A with the rights to broadcast the program, the program may be unavailable for storage and later broadcast via either the short-term or longer-term archives).

In some embodiments, the broadcast service provider may negotiate with the program owners (the "content owners") themselves for the right and authority to record and replay specific programs (e.g., the broadcast service provider negotiates with an owner D for the rights to broadcast a program E).

In some embodiments, governmental authorities and regulators may impose rules (e.g., such as "watershed" rules) which restrict access to programs. In some situations, embodiments ensure that programs which were first broadcast during a restricted period or watershed are not replayed during a restricted time period. Regulators may impose other requirements as well.

In some embodiments, individual subscribers may have a subscription which only provides them access to particular channels and programs. These types of restrictions may be imposed by consulting the customer database 14 via the video server manager 5.

In some embodiments, the broadcast service provider may create access rules to ensure that demand is properly managed. For example, the broadcast service provider may create access rules limiting the number of subscribers who may view a program from the short-term archive at the same time. In some embodiments, certain rules may be imposed during periods of peak viewing activity to further manage bandwidth and other resources.

As discussed above, information specifying each of these program rights rules, access rules or permissions may be stored in a database accessible to the broadcast service provider. In some embodiments, the access rules or permissions information are provided by regulators 13 or channel owners in the SI associated with each program. In some embodiments, the information is provided to BSS 4 from third party sources so that a database of access rules or permissions may be generated and associated with each of the programs in the schedules generated by the BSS 4. The information may also be transmitted to the timeslip server 3 for use in constructing the schedule table 41. In some embodiments, customer data stored in customer database 14 may be consulted when applying rules.

In some embodiments, a tagging scheme may be used to indicate the different types of program availability. For example, one particular tagging scheme may utilize two types of rules: content rules and time period rules (each of which can be imposed by any of the parties having influence over viewing, including channel owners, content owners, service providers, etc). A tagging scheme may include rules such as: (1) Content Rule: <regular expression> Available/Restricted/Unavailable; and (2) Period Rule: <original time period> Available/Restricted/Unavailable <viewing time period>.

For example, programs may be tagged as:
"Unavailable": any program marked as "Unavailable" in the availability database. Channel owners, regulators, or the broadcast service provider may designate a particular program as "Unavailable". In some embodiments, a subclass of "Not yet available" may also be used (e.g., to refer to any "next" program or a program which is currently being broadcast, but for which access is restricted for a period of time).
"Restricted": there are two cases of Restricted access—any current program which is marked as "Restricted" in the availability database and any program broadcast during a watershed or other regulated period. In some embodiments, access to "Restricted" programs is controlled. For example, subscribers may be required to enter a PIN or possess an access code.

"Available": as a result of the other rules not restricting availability, the program is currently available to view.

In some embodiments, these rules may be applied to a particular request as follows. Initially, a check may be performed to determine if any of the content rules match the requested program. If more than one rule matches the requested program, then the rules indicating "Unavailable" take precedence over any rules that indicate "Restricted" or "Available". If no content rules are applied, period rules may be applied to identify if there are any time period restrictions. Again, if more than one period rule is found, the rules which indicate "Unavailable" have precedence over "Restricted" or "Available". If no rules are matched by a request, then the requested program is available. In some embodiments, entire time periods may be made "Unavailable", and only particular programs are tagged as "Available".

These rules may be applied in conjunction with a request for a specific program or in conjunction with a request for a schedule from the BSS 4. For example, if a subscriber desires to view a program schedule, a request may be submitted from the set top box 8 to BSS 4. The BSS 4 returns a program schedule for a requested time period and, in some embodiments, only includes those items which are Available. In some embodiments, the BSS 4 returns a program schedule with both Available, Unavailable and Restricted programs listed. If a subscriber requests a program that is Unavailable, the set top box 8 may ensure that the request is denied. In some embodiments, if a subscriber requests a program that is Unavailable, the timeslip server 3 enforces the play restrictions and refuses to playout the program.

In some embodiments, components of the broadcast system of the present invention operate to capture management and other information which can be later queried and manipulated to determine subscriber activity, channel and program viewing statistics, and to provide evidence to broadcast channel providers/rights owners 12 that their access and permission rules have been observed.

In some embodiments, the system of the present invention may be configured to insert targeted promotions and advertising directed to particular subscribers. For example, such advertising may be inserted at the start, end or at some other point in the playback of programs from either the short-term or the longer-term archives. Targeting may be achieved by consulting the customer database 14 for information including, but not limited to, subscriber preferences, subscriber viewing history, age, sex and demographic information.

As discussed above, in some embodiments, subscribers may selectively cause programs to be stored for their access in a longer-term archive. In some embodiments, this longer-term archive is controlled by an archive content server 10, which may allow individual subscribers to store many hours of archive programming such as films, music and television broadcasts.

Figure 6:
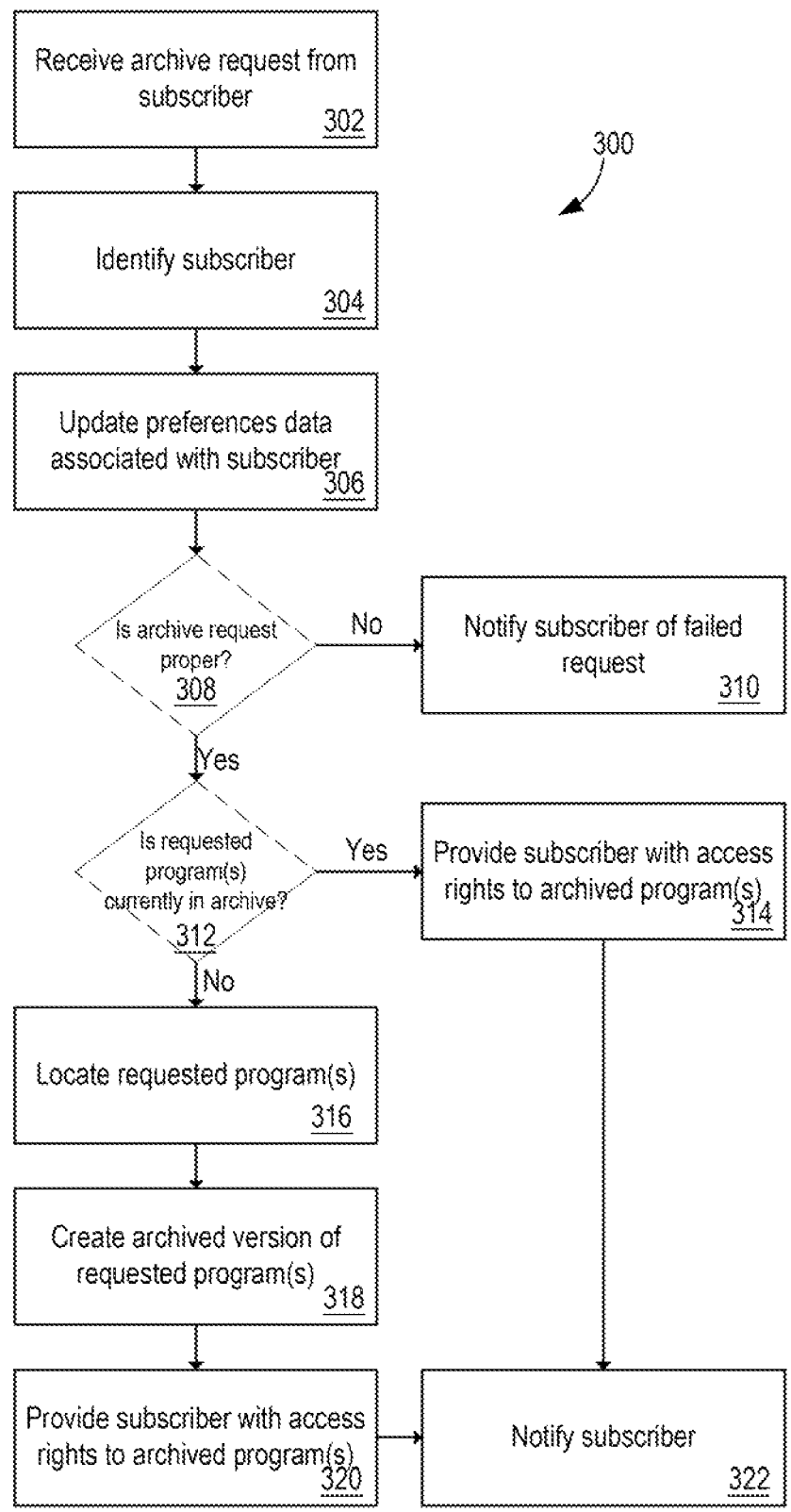
FIG. 6 is a flow diagram showing a process for creating an archive copy of a program pursuant to some embodiments.

Reference is now made to FIG. 6, where a flow diagram 300 is shown which represents process steps relating to the creation of an archive copy of a program based on a subscriber's request. Processing begins at 302 where an archive request is received from a subscriber. For example, an archive request may be directly submitted by a subscriber in response to viewing a program schedule (e.g., the subscriber may request archival of a program to be broadcast at 9 pm on July 1 on CNN). Archive requests may also be submitted based on customer preferences established by or on behalf of the subscriber. For example, a subscriber may indicate that he would like to archive all soccer matches that are televised and which involve a particular team.

Processing continues at 304 where the subscriber submitting the request is identified. In some embodiments, the subscriber may be identified based on a code stored in the set top box 8 associated with the subscriber. In some embodiments, the subscriber may be prompted to enter verifying information.

Once the subscriber has been identified, processing continues at 306 where preferences data associated with the subscriber's request are captured. This step may be an optional step which is included when marketing or consumer preference data is desired to be captured. For example, information associated with the details of the subscriber's request may be captured (e.g., information may be captured identifying the subscriber's demographics, the program requested, the time the request was submitted, etc). In this manner, subscriber information can be captured which allows targeted programming and advertisements to be offered to the subscriber (and to subscribers with similar demographics).

Processing continues at 308 where a determination is made whether the archive request is proper (e.g., whether the request can be satisfied). For example, processing at 308 may involve the application of one or more content and time rules to the request to determine if the program is available to the particular subscriber. If the program is not available to the particular subscriber, processing continues at 310 where the subscriber is informed of the failed request (e.g., including a message providing details of why the request was declined). Further, in some situations, a request may be declined if the requested program has already been aired (and if the program is no longer stored in the short-term archive).

Processing continues at 312 if the requested program is available for archive. In some embodiments, to avoid the creation of multiple copies of the same program in different longer-term archives, a single longer-term archive (or several) may be created and shared among a number of subscribers. For example, some popular programs may receive numerous requests to be archived. Processing at 312 may include determining whether the requested program is already in a longer-term archive. If so, the subscriber requesting the program may be provided with access rights to the previously-archived program at 314. For example, a permissions database associated with the longer-term archive may be updated to indicate that the subscriber is to have access to the program. Processing may continue at 322 where the subscriber is notified of the successful archival.

If the requested program has not been previously archived, processing may continue at 316 where timeslip server 3 operates to locate the requested program (either in the short-term archive or on the program schedule created by the BSS 4). If the requested program is in the short-term archive, the timeslip server 3 causes (at 318) a copy to be made in the longer-term archive maintained by archive content server 10. If the requested program has not yet aired, timeslip server 3 causes (at 318) an archive copy to be made in the longer-term archive once the program airs. Processing continues at 320 where the subscriber is provided access rights to the archived program, and at 322 where the subscriber is notified of the successful creation of the archive copy. In this manner, subscribers may selectively request the creation of archive copies which are accessible to them.

In some embodiments, the subscriber may be assessed an agreed fee (including, but not limited to, one-off payments, subscription, and time limited access) for creating the "personal" archive copy of a program. Timeslip server 3 ensures that access and use restrictions are enforced, and causes a copy of the program to be transferred for storage by the archive content server 10.

Typically the archive content server 10 will include a local data storage facility. When browsing through a program schedule, the subscriber will be provided with the facility to select a program to be archived. The video server manager 5 arranges for the timeslip server 3 to transfer the program to the archive content server 10, unless it already has a copy of that program.

In some embodiments, the archive content server 10 will construct an information table similar to the schedule table created by timeslip server 3 which identifies the program, includes details of the event ID and identifies the position on the disk at which the program is stored. The subscriber will be able to access the schedule within the archive content server 10 and select a program within the archive content server 10 for viewing in a similar manner to the selection from the timeslip server 3.

In some embodiments, programs included within a subscriber's personal archive will be automatically deleted after an agreed time window has elapsed. With agreement from broadcast channels or content rights owners, embodiments can increase the length of time that a personal archive may store a copy of a program to provide longer term server side storage with or without additional fee or subscription. Subscribers can manage their archive area by adding new programs to it, or deleting existing programs.

In some embodiments, there are no restrictions regarding selecting the playback source, so long as only one source is playing for each subscriber. For example, a subscriber may selectively choose to view a "live" program, a stored program from the short-term archive, or a program stored in the subscriber's personal archive (the "longer-term" archive). In some embodiments, a number of televisions may be connected to a subscriber's set top box 8, or there may be more than one set top box 8 associated with a subscriber. In these cases, a subscriber's household may view different programs.

Embodiments of the invention enable the capture and storage on a centralised server system of all the programs broadcast by a television broadcast channel for playback by subscribers within a predefined window of time, according to business rules jointly agreed with the broadcast channel or content owner.

Numerous broadcast channels can be simultaneously captured and stored, providing subscribers with on-demand access to all the programs broadcast by all those channels within the agreed time window.

Due to the simultaneous storage of multiple broadcast channels, the viewer has a very wide range of content to choose from. For example, if the schedules for 10 broadcast channels are made available for the previous 72 hours, and if the average program length is 30 minutes, pursuant to embodiments of the present invention, subscribers would have a choice, at any given time, of approximately 1440 programs (including live broadcasts and short-term archives of broadcasts). A viewer who does not have access to short-term archives pursuant to the present invention would only have a choice of viewing 10 programs. Furthermore, pursuant to embodiments of the present invention, a subscriber may either view a program "live" from its schedule starting time, or the subscriber may view it as an archived program with the additional ability of FF, REW, and pause controls.

Embodiments provide broadcast channel providers and content rights owners with a very high degree of control over the playback of previously broadcast programs. For example, broadcast channel providers and content rights owners are able to entirely restrict the ability to playback programs from the short- or longer-term archives (e.g. Broadcast Channel A may wish to restrict access to previously broadcast news services), to limit the length of the playback window, or to adjust the level of interactivity available within each program. Embodiments can also prevent a subscriber from archiving or recording certain programs. Further, embodiments of the present invention allow broadcasters and service providers to remain within statutory rules (e.g., such as "watershed" rules), by requiring PIN-protection on relevant programs and by denying access to others.

In some embodiments, all content, including all broadcast channels, short-term archive programs and longer-term archive programs, are delivered to a subscriber direct from remote servers. This ensures that there is a seamless integration between the delivery of "live" programs, short-term archive programs, and longer-term archive programs, all of which can be accessed via a single menu (e.g., through the schedules presented to subscribers via set top boxes 8). This single menu can also be used to change channels, view future broadcast schedules or perform other tasks including other selection methods.

The remote servers have the potential to store complete broadcast channel schedules but with playback determined by business rules agreed with individual broadcast channels. This means that broadcast channels or content rights owners retain a high degree of control over how all their content is viewed in an on-demand environment.

A very wide range of previously broadcast programs are available on demand with no action required by the viewer, and with no client side restrictions on the volume of content that can be stored.

Embodiments of the present invention have been described in terms of several embodiments solely for the purpose of illustration. Persons skilled in the art will recognize from this description that the invention is not limited to the embodiments described, but may be practiced with modifications and alterations limited only by the spirit and scope of the appended claims. For example, while embodiments have been described with reference to the MPEG-2 standard, those skilled in the art will appreciate, upon reading this disclosure, that other encoding technologies may be utilized. For example, other standards currently used or may also be utilized (e.g., such as MPEG-4 and/or H.264, etc.).

What is claimed is:

1. A method for operating a broadcast system, the broadcast system receiving a broadcast data stream having a plurality of programs and associated service information, comprising:

extracting a copy of each of the plurality of programs in real time;

storing the copy of each of the plurality of programs;

simultaneously, extracting service information embedded in each program from said broadcast data stream in real time;

compiling and storing a historical schedule of received programs from said service information extracted from said broadcast data stream;

receiving a program selection from a subscriber, the program selection indicating a request for access to a desired program from said historical schedule;

confirming that said subscriber is authorized to access said desired program in accordance with program rights data which specifies rules relating to the broadcast of that program; and, permitting access to a copy of said desired program by the subscriber in accordance with the program rights.

2. A method according to claim 1, further comprising transmitting an electronic program guide to said subscriber for viewing by said subscriber, wherein the electronic program guide is compiled in dependence on said historical schedule and program rights data to indicate programs that are available to said subscriber.

3. A method according to claim 1, in which the program rights data is operative to at least one of (i) prevent the playback of a program during a restricted time period, and (ii) restrict access to a program to subscribers who have acquired subscription rights to view the program.

4. A method according to claim 3, in which a check is made to confirm any subscription rights associated with said subscriber before access is authorized, wherein said subscriber is identified.

5. A method according to claim 1, in which said received programs are initially stored in a temporary archive.

6. A method according to claim 5, further comprising: copying said desired program from said temporary archive to a longer-term archive for said subscriber to access, wherein program rights are applied to the longer-term archive copy to control subsequent access by the subscriber.

7. A method according to claim 1, in which access to said desired program is denied if any request for access to a copy of the program conflicts with any program rights associated with the program.

8. A method according to claim 1, in which program rights data is associated with a program using data extracted from the service information, wherein the step of extracting service information embedded in each program from said broadcast stream occurs in real time and simultaneously with the step of storing a copy of each of the programs.

9. An apparatus for storing broadcast programs for future transmission to a plurality of subscribers, comprising:
   means for receiving a broadcast channel data stream comprising a plurality of sequential programs;
   means for extracting a copy of each of the plurality of sequential programs in real time;
   a data storage means for storing the copy of each of the plurality of sequential programs;
   means for extracting service information embedded in each program from the broadcast channel data stream in real time;
   means for compiling and storing a historical schedule of received programs from said service information extracted from said broadcast channel data stream;
   means for receiving a program selection from a subscriber, the program selection indicating a request for access to a desired program from said historical schedule;
   means for confirming that said subscriber is authorized to access said desired program in accordance with program rights data which specifies rules relating to broadcast of that program; and,
   means for permitting access to a copy of said desired program by the subscriber in accordance with the program rights.

10. An apparatus according to claim 9, further comprising means for transmitting an electronic program guide to said subscriber for viewing by said subscriber, wherein the electronic program guide is compiled in dependence on said historical schedule and program rights data to indicate programs that are available to said subscriber.

11. An apparatus according to claim 10, in which electronic program guide includes information that indicates restrictions on subscriber access to programs, or in which the electronic program guide does not include programs which said subscriber is not authorized to view.

12. An apparatus according to claim 9, in which the program rights data is operative to prevent the playback of a program during at least one of (i) a restricted time period, and (ii) a period in which the program rights data restricts access to a program to subscribers who have acquired subscription rights to view the program.

13. An apparatus according to claim 12, further comprising means for checking to confirm any subscription rights associated with said subscriber before access is authorized, and means for identifying the subscriber using a subscriber identifier received from the subscriber.

14. A broadcast system, comprising:
   a head end, coupled to receive an input broadcast channel data stream comprising a plurality of programs, said head end generating an output data stream comprising said plurality of programs in an output format;
   a service information processor, in communication with said head end and receiving said input broadcast data channel data stream, said service information processor retrieving service information embedded in each of the plurality of programs;
   a timeslip server, in communication with said head end and said service information processor, said timeslip server storing a copy of said plurality of programs;
   a broadcast schedule server, coupled to said service information processor, compiling a historical schedule of received programs in dependence on said service information; and,
   a transmission network, coupled to said head end and to said timeslip server, said transmission network operable to transmit said output data stream to a plurality of subscriber devices and to selectively transmit said copies of said plurality of programs to said plurality of subscriber devices; wherein,
   the timeslip server is adapted to receive a program selection from a subscriber, the program selection indicating a request for access to a desired program from said historical schedule;
   the timeslip server is further adapted to confirm that said subscriber is authorized to access said desired program in accordance with program rights data which specifies rules relating to broadcast of that program; and
   the timeslip server is further adapted to permit access to a copy of said desired program by the subscriber in accordance with the program rights.

15. A broadcast system according to claim 14, further comprising:
   an archive content server, coupled to said timeslip server and said transmission network, said archive content server storing a longer-term copy of programs selected by the subscriber.

16. A broadcast system according to claim 14, wherein said broadcast schedule server is coupled to transmit an electronic program guide to said plurality of subscriber devices, wherein the electronic program guide is compiled in dependence on said historical schedule and program rights data to indicate programs that are available to said subscriber.

* * * * *